T. NAUS.
PNEUMATIC TIRE.
APPLICATION FILED SEPT. 14, 1921.
1,436,720.
Patented Nov. 28, 1922.
2 SHEETS—SHEET 1.
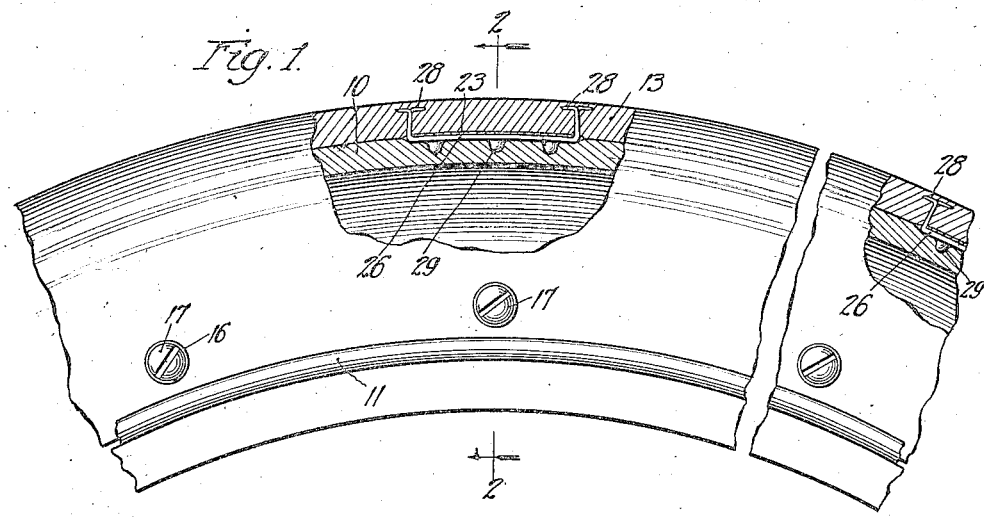
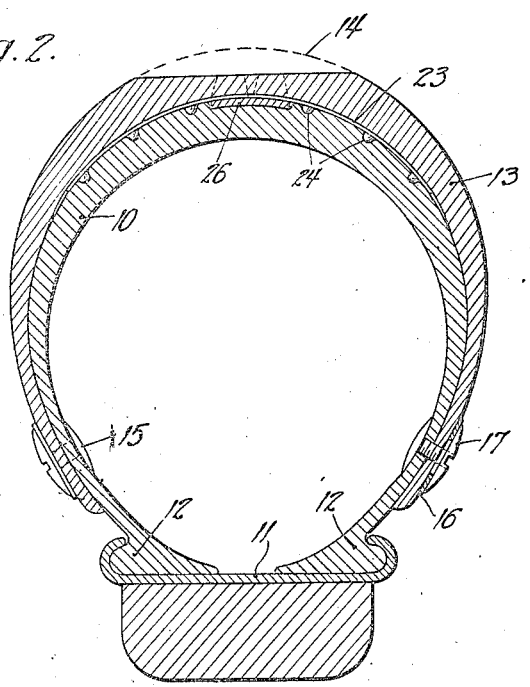
Inventor:
Theodore Naus
By: Nissen & Crane Attys.

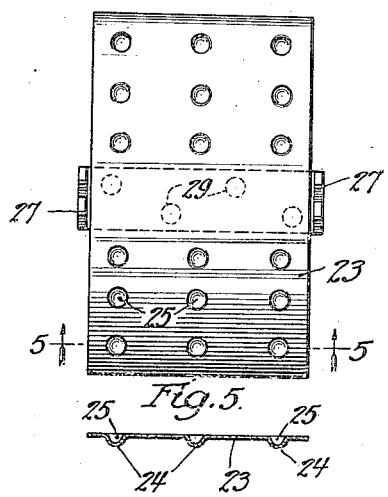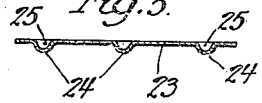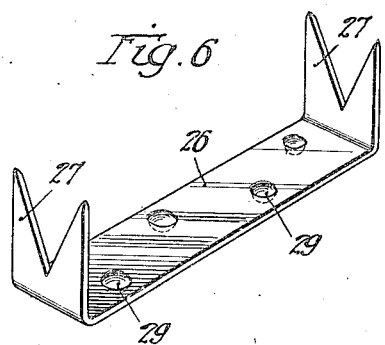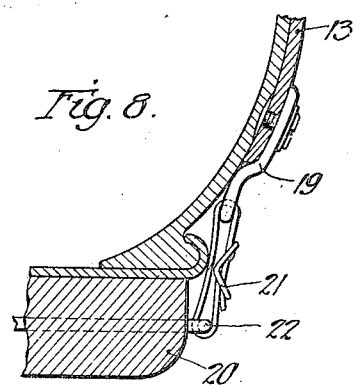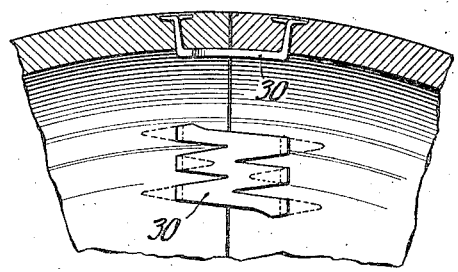

Patented Nov. 28, 1922.

1,436,720

UNITED STATES PATENT OFFICE.

THEODORE NAUS, OF CHICAGO, ILLINOIS.

PNEUMATIC TIRE.

Application filed September 14, 1921. Serial No. 500,544.

*To all whom it may concern:*

Be it known that I, THEODORE NAUS, a citizen of the United States, residing at Chicago, in the county of Cook and State of Illinois, have invented certain new and useful Improvements in Pneumatic Tires, of which the following is a specification.

This invention relates to an improved adaptation of pneumatic tire casings whereby the life of a casing may be greatly increased.

The invention is exemplified in the combination and arrangement of parts shown in the accompanying drawings and described in the following specification, and it is more particularly pointed out in the appended claims.

In the drawings—

Fig. 1 is a fragmentary elevation with parts broken away showing a portion of a tire casing having one embodiment of the present invention applied thereto;

Fig. 2 is a section on line 2—2 of Fig. 1;

Fig. 3 shows a fastener used in connection with the invention;

Fig. 4 is a plan view showing a vacuum friction plate and holder forming a part of the present invention;

Fig. 5 is a section on line 5—5 of Fig. 4;

Fig. 6 is a perspective view showing the vacuum friction plate holder;

Fig. 7 is a fragmentary sectional view showing a splicing device for tire casings employed in connection with the present invention; and Fig. 8 shows a modified form of a fastening device.

It is a well-known fact that as ordinarily used the casings for pneumatic tires are worn away on the tread along a narrow band extending around the circumference of the tire. As soon as the tire is worn away along this narrow strip sufficiently to somewhat weaken the material it becomes subject to blow-outs or punctures so that the tire has to be discarded, although only a very small percent of the actual material has been worn away and although a great deal of serviceable material still remains on both sides of the worn strip on the extreme periphery of the tread. Many tires also have to be discarded because of blow-outs or other injuries on the sides of the casing which result from rim cuts or other causes.

The present invention provides for the continued use of tires after they have reached a point in their wear at which they would have to be discarded if used in accordance with the ordinary practice. In practice it has been found to be easily possible to double the mileage which can be obtained from a tire casing by the use of the invention herein.

In the drawings, the numeral 10 designates a tire casing of any ordinary construction which is secured to the rim 11 by the clincher rings 12 in the usual manner. The casing 10 may be one which has been used until it has given practically its maximum service. The casing 10 is reinforced by a supplemental casing 13 which may also be one which has given its maximum service when used singly. From the casing 13 the clincher rings are cut away and the casing is secured to the outside of the casing 10 so that the supplemental casing 13 provides the tread surface for the vehicle. The two casings are so arranged that any blow-out holes or other serious imperfections will be staggered in relation to one another so that the combined casing may be used without danger of injury to the inner tube.

In Fig. 2 of the drawings the portion included by the broken line 14 represents the material worn away during the ordinary use of the casing. It will be seen that only a very narrow strip is available during such use and that by the time a wide tread has been produced by the wearing operation the casing has been so thinned on the center line that further use is liable to produce a blow-out. When the casing is combined in the manner shown with an interior casing, however, the outer casing is not subjected to the pressure of the inner tube and may be used until worn entirely through. It will be seen that wear will be much slower during this latter part of the service than it was during the first part of the life of the tire for the reason that the tread is much broader and there is a great deal more material to resist the wear. In order to thus combine two casings it is, of course, necessary to securely hold the outer casing in place and to do this two requirements must be taken into consideration. The edges of the outer casing must be secured to the inner casing in such a way as to prevent entrance of foreign matter between the two parts, and when this is done means must be provided to prevent the casings from slipping relative to one another since such slippage would destroy the fastenings for the edges of the outer casing.

In the drawings I have shown two methods of securing the edges of the outer casing in place. In the form of the invention shown in Figs. 1 and 2 I employ flat-headed screws 15, such as shown in Fig. 3. These screws are pointed so that they may be readily pushed or driven through the two casings from the inside, and when in place washers 16 and nuts 17 are attached to retain the screws in place and hold the parts together. When the nuts are tightened the flat heads will be sufficiently imbedded in the inner casing to prevent any injury to the inner tube. After the parts have been secured together the pointed ends of the screws 15 are cut off so that no projections appear and a workman-like job is produced.

If for any reason the user does not wish to pierce the inner casing, instead of securing the edges of the outer casing directly to the inner casing a number of fastening clips 19, Fig. 8, may be secured to the outer casing 13, as shown in Fig. 8, and these fastening clips may then be attached to the felly 20 of the automobile wheel by strips 21 which are attached to fasteners 22 extending through the felly at spaced intervals about its periphery. This arrangement avoids the necessity of perforating the inner casing.

Before securing the edges of the outer casing in place, vacuum friction plates 23, Figs. 4 and 5, are placed at spaced intervals about the periphery of the tire between the two casings. These plates may be made of any suitable material, such as sheet metal, and are provided with a series of projections 24 on one face thereof which are formed by punching out a portion of the sheet material leaving a cup-shaped depression 25 opposite each of the projections 24. The plate 23 is preferably secured to the inner face of the outer casing by a fastener 26, Fig. 6. This fastener is provided with pointed angular tines 27 which are forced into the material of the outer casing and are bent over, as shown at 28, Fig. 1, to hold the fastener and plate 23 in place. The plate 23 does not depend, however, entirely upon the holder 26 to prevent movement thereof relative to the casings. The depressions 25 are pressed firmly against the smooth inner face of the outer casing and thus form vacuum cups which firmly grip the surface of the outer casing and resist force tending to slide the plate relative to the outer casing. The projections 24 firmly imbed themselves in the outer face of the inner casing due to the pneumatic pressure within the tire so that the plate is held against movement relative to the outer casing. In this way the two casings are firmly held against any sliding movement relative to one another and any danger of tearing the casings apart at their fastenings is avoided. The fastener 26 may also be provided with projections 29 struck outwardly therefrom which imbed themselves in the inner casing and assist the plate 23 in holding the parts against relative movement.

It is not necessary that the outer casing 13 be a complete integral part, but may be made up of two or more sections held together by fasteners 30, as shown in Fig. 7. This makes it possible to utilize casings that have parts so badly worn or injured that they are not available. In such instances the available parts of two or more casings may be spliced together by suitable fasteners and used for the outer or tread casing.

I claim:

1. In combination, a tire casing, a second casing superimposed upon said first-mentioned casing to form a reinforcing covering therefor, and a friction plate interposed between said casings, said plate having projections on one face thereof and depressions forming vacuum cups on the opposite face thereof.

2. In combination, a tire casing having a covering superimposed thereon and forming a reinforcement therefor, means for securing the edges of said covering in place adjacent the inner periphery of said casing, and a friction vacuum plate interposed between said casing and said covering, said plate having projections thereon arranged to engage the outer face of said casing and having depressions forming vacuum cups for contact with the inner face of said covering to prevent relative movement of said casing and said covering.

3. In combination, a pair of tire casings arranged one within the other to mutually reinforce each other, and friction plates disposed at spaced intervals between adjacent faces of said casings to prevent slippage of said casings relative to one another, said plates having projections arranged to be imbedded in the outer surface of the inner casing and having depressions forming vacuum cups for engaging the inner face of the outer casing.

4. In combination, a pair of tire casings arranged one within the other, a friction plate interposed between said casings, a fastener arranged astride said plate and secured to the outer one of said casings, and projections on said plate arranged to imbed themselves in the outer face of the inner one of said casings.

5. In combination, a pair of tire casings one of which is superimposed upon the other to form a reinforcement therefor, means for securing the edges of said superimposed casing in place adjacent the inner periphery thereof, and means interposed between adjacent faces of said casings to prevent slippage of said casings relative to one another, said interposed means comprising a plurality of peripherally spaced plates, each of said plates having projections extending inwardly therefrom to engage the outer face of the innermost casing and having depressions on the opposite face thereof to engage the inner face of the outer casing, and fasteners arranged to engage said plates and secure said plates to said outer casing.

In testimony whereof I have signed my name to this specification on this 12th day of September, A. D. 1921.

THEODORE NAUS.